(12) United States Patent
Mizumo et al.

(10) Patent No.: US 6,285,420 B1
(45) Date of Patent: *Sep. 4, 2001

(54) EDGE ILLUMINATED DISPLAY DEVICE WITH LIGHT GUIDING MEMBER

(75) Inventors: Yoshiyuki Mizumo, Kaizuka; Makoto Takahashi, Toyokawa, both of (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/592,888

(22) Filed: Jan. 29, 1996

(30) Foreign Application Priority Data

Jan. 31, 1995 (JP) .................................... 7-014101

(51) Int. Cl.[7] .................................... G02F 1/1339
(52) U.S. Cl. ............................... 349/65; 362/31
(58) Field of Search .................. 349/62, 63, 65; 385/129, 130, 901, 146; 362/26, 27, 31; 40/546

(56) References Cited

U.S. PATENT DOCUMENTS

| 4,549,819 | * | 10/1985 | Muramoto et al. | 349/63 |
|---|---|---|---|---|
| 4,626,074 | * | 12/1986 | Crossland et al. | 349/63 |
| 4,668,049 | * | 5/1987 | Canter et al. | 349/63 |
| 4,860,171 | * | 8/1989 | Kojima | 362/31 |
| 5,046,826 | * | 9/1991 | Iwamoto et al. | 349/61 |
| 5,099,343 | * | 3/1992 | Margerum et al. | 349/63 |
| 5,410,454 | * | 4/1995 | Murase et al. | 362/31 |
| 5,537,233 | * | 7/1996 | Miura et al. | 349/65 |
| 5,825,440 | * | 10/1998 | Kim | 349/61 |

FOREIGN PATENT DOCUMENTS

| 0399506 | 11/1990 | (EP) . |
|---|---|---|
| 0545705 | 6/1993 | (EP) . |
| 56-52788 U | 5/1981 | (JP) . |
| 56-142089 U | 10/1981 | (JP) . |
| 60-150585 U | 10/1985 | (JP) . |
| 64-17019 | 1/1989 | (JP) . |
| 2-47630 | 2/1990 | (JP) . |
| 2-53040 | 2/1990 | (JP) . |
| 2047630 | 2/1990 | (JP) . |
| 5-45653 U | 6/1993 | (JP) . |
| 6075218 | 3/1994 | (JP) . |
| 4-40269 U | 4/1994 | (JP) . |
| 6-25802 U | 4/1994 | (JP) . |

* cited by examiner

Primary Examiner—Kenneth Parker
(74) Attorney, Agent, or Firm—Sidley & Austin

(57) ABSTRACT

An illuminated display system having a display member and a light guiding member faces and extends in parallel with the display member. The display member includes a displaying element and a structural element. A light source illuminates the side ends of the display member and the light guiding member so that light which is transmitted by multiple internal reflections through both the display member and the light guiding member to illuminate the display.

46 Claims, 7 Drawing Sheets

EDGE ILLUMINATED DISPLAY DEVICE WITH LIGHT GUIDING MEMBER

BACKGROUND OF THE INVENTION

This invention relates to an illuminator for illuminating a display member, a display device provided with a display member illuminator, and an appliance provided with a display device.

In recent years, a wide variety of functions are given to highly sophisticated appliances, for example, office automation appliances such as copying machine, printer, and deskupper computer, optical appliances such as camera, audio appliances, video appliances, television sets, video game machines, and the like. In these appliances, an LCD (liquid crystal display) member has been generally used to display an operative state of the appliance in letters and figures. Also, there has been recently proposed use of PLZT (lead lanthanum zirconate titanate) as a display member for such appliances.

However, such display members do not emit light themselves. Accordingly, when a display device provided with such display member is used in dark, e.g., at night, a display image cannot be visually recognized. For this reason, there is usually provided a display member illuminator for illuminating the front or rear surface of a display member such as LCD member.

FIG. 9 shows a conventional display device. This display device includes an LCD member 30 and an LCD illuminator for illuminating the LCD member. The LCD illuminator includes an electroluminesent member 80 provided at a back of the LCD member 30 to supply light to the LCD member 30 and a drive circuit 90 for supplying a high voltage to the electroluininesent member 80. The electroluminesent member 80 emits light to illuminate the LCD member 30 uniformly. A specified image appears and disappears on the surface of the LCD member 30 in accordance with application of a drive voltage to transparent electrodes of the LCD member.

However, the electroluminesent member 80 requires an alternating current having a high voltage to emit light, inevitably making the size of the drive circuit 90 undesirably large. Thus, it has been very difficult to mount the LCD display device provided with such electroluminesecent illuminator on highly sophisticated appliances, such as a camera, which need a compact construction.

FIG. 10 shows another conventional display device. In this display device, an LCD member 30 is placed over a light guiding member 40 made of glass having substantially the same size as the LCD member 30. A light emitting member 50 including an LED (light emitting diode) is provided on one side end of the light guiding member 40. Light from the light emitting member 50 incident on the light guiding member 40 is diffused in the member 40, and is supplied to the LCD member 30 through the top surface of the member 40. Accordingly, the LCD member 30 is uniformly illuminated by the light having passed through the member 40. Since the LED can emit light upon a very small electric power, it is not necessary to provide a large drive circuit as in the above-mentioned LCD illuminator. Japanese Unexamined Utility Model Publication Nos. 56-52788, 4-40269, and 6-25802 disclose a display device provided with such LCD illuminator.

However, the light from the light emitting member 50 is incident only on the light guiding member 40 through its end surface, and is supplied to the LCD member 30 after being diffused in the light guiding member 40. Accordingly, in order to obtain a large amount of illuminating light, the light guiding member 40 needs to have a large thickness. This makes the combined size of the LCD illuminator and the display device larger. Accordingly, it has been very difficult to mount the display device provided with such LCD illuminator on compact highly sophisticated appliances.

FIG. 11 shows still another conventional display device. In this display device, there is provided an illuminator including a frame 60 for supporting an LCD member 30 and a plurality of LEDs 51 arranged in an illumination chamber 60a of the frame 60 beneath the LCD. The inner wall surfaces 60b of the illumination chamber 60a that tapers toward the lower act as a reflector. The light emitted from the LEDs is gathered and diffused upon being reflected by the reflector 60b, and then is incident on the LCD member 30. A display device of this type is disclosed in Japanese Unexamined Utility Model Publication No. 60-150585 and Japanese Unexamined Patent Publication No. 2-53040.

However, the illumination chamber 60a formed with the reflector 60b is provided below the LCD member 30. This makes the entire size of the LCD illuminator larger. Thus, similar to the above-mentioned conventional display devices of FIGS. 9 and 10, it has been difficult to mount the display device provided with such illuminator on compact highly sophisticated appliances.

Further, Japanese Unexamined Patent Publication No. 2-47630 discloses a display device provided in a viewfinder of a camera. In this device, an LCD member includes an LC (liquid crystal) cell and upper and lower plates sandwiching the cell. A light emitting member is attached on one side end of the LCD member. Illuminating light is introduced from the light emitting member into the upper and lower plates to illuminate the LC cell.

This display device is used in the viewfinder of a camera that has a small viewing area. The viewing area is not larger than 1 $cm^2$, which thus does not require a large amount of illuminating light. Accordingly, such LCD illuminator cannot be used for a display device having a large viewing area which requires a large amount of light.

SUMMARY OF THE INVENTION

It is an object of the present invention to provide a display member illuminator for illuminating a display member which can supply a larger amount of illuminating light to a display member in a smaller size.

It is another object of the present invention to provide a display device which is smaller in size and can produce a sufficiently bright display image.

It is still another object of the present invention to provide an appliance which is provided with a bright and compact display device.

The present invention is directed to an illuminator for illuminating a display member, comprising: a light guiding member which faces and extends in parallel with a display member; and a light source which faces both a side end of the display member and a side end of the light guiding member and supplies light to both the display member and the light guiding member by way of their respective side ends.

The display member may include a liquid crystal display. It may be appreciated to use a liquid crystal display capable of passing light therethrough. In this case, the light guiding member is preferably disposed below the display member. Also, it may be appreciated to use a liquid crystal display capable of reflecting incident light at a bottom thereof. In this case, the light guiding member is preferably disposed above the display member. Further, it may be preferable that the light guiding member forms a display window through which a display image on the display member is viewed.

Also, the present invention is directed to a display device comprising: a display member; a light guiding member which faces and extends in parallel with the display member; and a light source which faces both a side end of the display member and a side end of the light guiding member and supplies light to both the display member and the light guiding member by way of their respective side ends.

Further, the present invention is directed to an appliance comprising: a display portion; a display member provided in the display portion; a light guiding member which faces and extends in parallel with the display member; a light source which faces both a side end of the display member and a side end of the light guiding member and supplies light to both the display member and the light guiding member by way of their respective side ends, and a driver which drives the display member to produce a display image.

According to the present invention, light from the light source is incident on both the light guiding member and the display member. Accordingly, a sufficient amount of light can be supplied to the display member by a smaller illuminator.

Also, a display device of the present invention is provided with a display member illuminator which supplies light to both the light guiding member and the display member. This makes it possible to reduce the size of display member illuminator significantly. Also, a larger amount of light is supplied to the display member without increasing the size of illuminator, thereby producing a brighter and more contrasting display image.

Also, an appliance of the present invention is provided with a display device which includes the display member illuminator capable of supplying light to both the light guiding member and the display member. Accordingly, the appliance can provide a brighter and more contrasting display image while its internal mechanisms and appearance are not adversely affected.

These and other objects, features and advantages of the present invention will become more apparent upon a reading of the following detailed description and accompanying drawings.

DETAILED DESCRIPTION OF THE PREFERRED EMBODIMENT OF THE INVENTION

Figure 1:
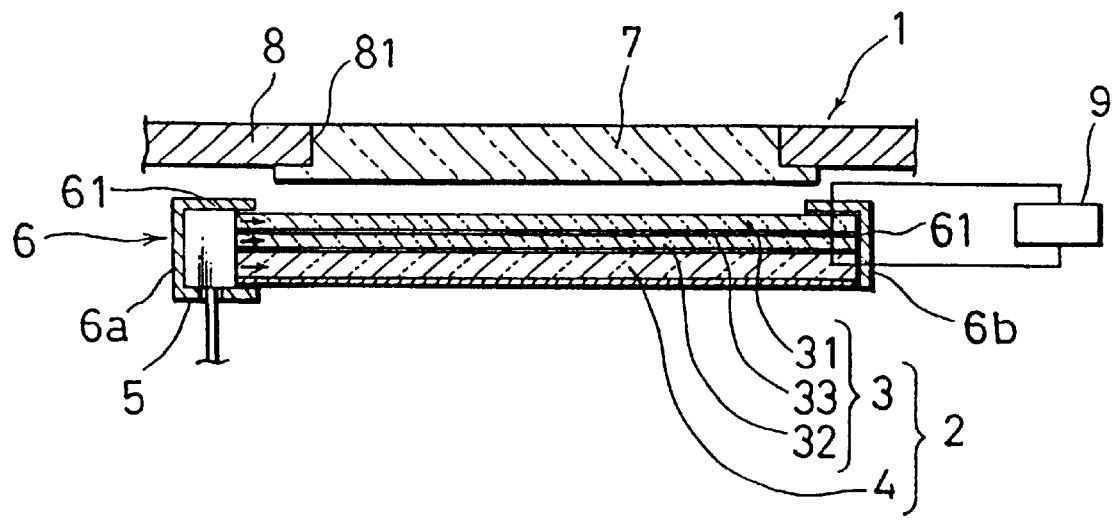
FIG. 1 is a sectional view of a first display device embodying the present invention, the first display device being provided with a first display member illuminator of the present invention.
Figure 2:
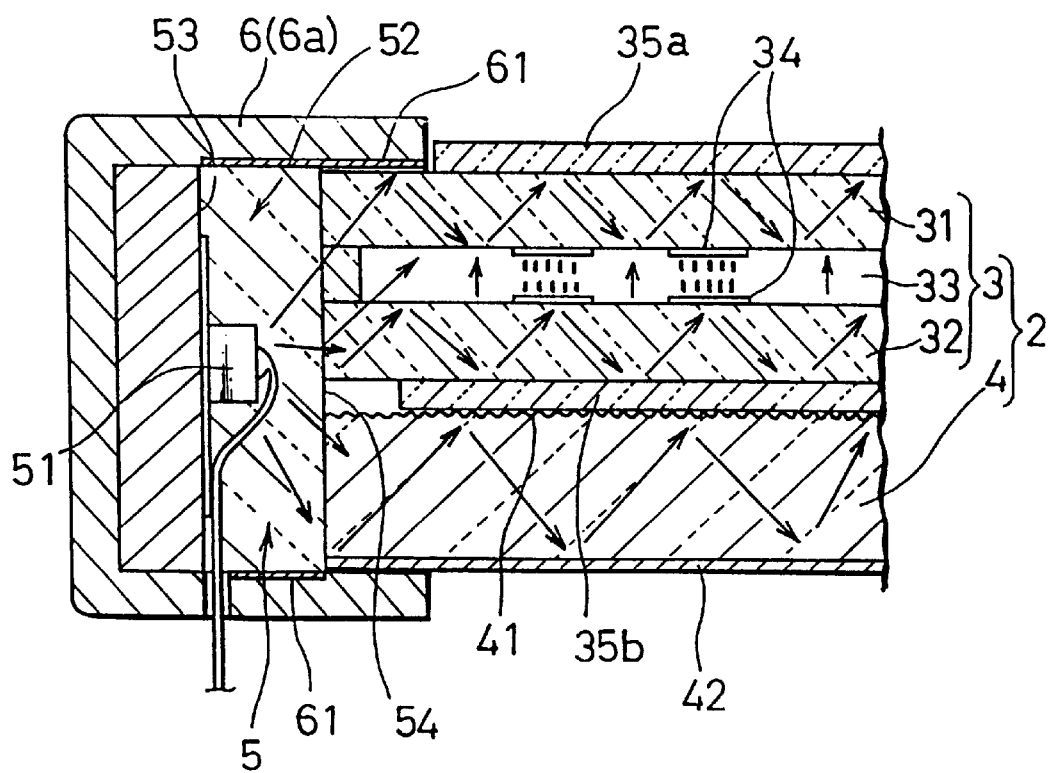
FIG. 2 is an enlarged sectional view of a main portion of the first display device.

FIG. 1 is a sectional view of a display device provided with a display member illuminator as a first embodiment of the invention, and FIG. 2 is an enlarged sectional view of an essential portion of the first display device.

The display device 1 includes a layer assembly 2 including an LCD member 3 and a light guiding member 4 placed below the LCD member 3, a light emitting member 5 provided in close contact with a left end surface of the layer assembly 2, and a support member 6 for securely fastening the light emitting member 5 and the layer assembly 2. The light guiding member 4 and the LCD member 3 are disposed in parallel to each other along a propagation path of the light from the light emitting member 5. In FIG. 2, the LCD member 3 and the light guiding member 4 are spaced apart from each other. However, the LCD member 3 and the light guiding member 4 may be in contact with each other.

The display device 1 is placed in a housing 8 of an appliance in which the display device 1 is mounted. FIG. 1 shows a part of the housing 8. The housing 8 is formed with a display window 81. A protecting member 7 is fitted in the display window 81. The protecting member 7 is made of transparent material, e.g., glass, to enable viewing of a display image on the LCD member 3 as well as to protect the LCD member 3.

The LCD member 3 includes a upper plate 31, a lower plate 32, an LC cell 33 sealingly contained between the upper and lower plates 31 and 32, and transparent electrodes 34 provided in the LC cell 33. The upper and lower plates 31 and 32 are made of transparent material, e.g. glass. The LC cell 33 is of the TN-type.

Further, a display driver 9 is provided to drive the transparent electrodes 34 to produce a desired display image. Specifically, the display driver 9 selectively applies a drive voltage to the transparent electrodes 34 to bring molecules of the LC cell 33 into a specified orientation where the light propagating between the transparent electrodes 34 propagates directly straight. When the drive voltage application is suspended, the orientation of the molecules of the LC cell 33 changes and the light propagating between the transparent electrodes 34 is polarized in a twisting (90° twist) direction of the liquid crystal molecules. The display driver 9 is controlled by a controller provided in an appliance on which the display device is mounted.

A thin polarizing plate 35a having a specified polarization characteristic is placed over the top surface of the upper plate 31, and a polarizing plate 35b having a polarization characteristic normal to that of the polarizing plate 35a is placed below the bottom surface ofthe lower plate 32.

The LCD member 3 and the light guiding member 4 are disposed such that the top surface of the light guiding member 4 is in close contact with the lower light polarizing plate 35b. Accordingly, in the absence of an applied voltage, the light from the light guiding member 4 passes through the two polarizing plates 35a, 35b and the LC cell 33. However, upon the voltage application, the light having passed through the lower polarization plate 35b and the LC cell 33 is blocked by the upper polarization plate 35a.

The light guiding member 4 is made of transparent or opaque material, e.g., glass, acrylic. In the top surface of the light guiding member 4 is formed a serration 41 having fine wavelike recesses and projections. On the bottom surface of the light guiding member 4 is adhered a reflection sheet 42 to prevent the light incident upon the light guiding member 4 from leaking outside. The reflection sheet 42 is made of a reflective metal. Alternatively, it may be appreciated to deposit a reflective metal on the bottom surface of the light guiding member 4.

The light emitting member 5 includes a light emitting diode (LED) 51, a protector 52, and a reflector 53. The protector 52 is made of transparent synthetic resin. The light of the LED 51 is incident upon the left end surface of the layer assembly 2 from a right end surface 54 of the protector 52 after propagating directly or being reflected by the reflector 53.

The height of the light emitting member 5 is made to be equal to that of the layer assembly 2. Accordingly, the light from the light emitting member 5 is incident on the upper and lower plates 31 and 32, and the light guiding member 4 of the layer assembly 2.

In this embodiment, the light emitting diode 51 is used as a light source of the light emitting member 5. However, the present invention is not limited to a light emitting diode (LED). For example, a normal lamp may be used as a light source of the light emitting member 5.

The support member 6 includes a first support fitting, 6a of a U-shaped cross section for integrally supporting the light emitting member 5 and the layer assembly 2 at the left end of the light emitting member 5 and a second support fitting 6b for supporting the layer assembly 2 at the right end of the layer assembly 2. The first and second support fittings 6a and 6b are connected with each other via unillustrated connecting members which are disposed on front and rear ends of the layer assembly 2. The front and rear connecting members prevents the light incident on the layer assembly 2 from leaking forward and rearward.

The light emitting member 5 and the layer assembly 2 are adhered to each other by adhesive while being tightly held by the first and second support fittings 6a and 6b.

Reflection sheets 61 are provided on the inner surfaces of the first and second support fittings 6a and 6b and on the inner surfaces of the front and rear connecting members to reflect the light from the LED 51, thereby effectively preventing the light from the LED 51 from being reduced in its amount.

In the first embodiment, as shown in FIGS. 1 and 2, the light emitted from the LED 51 is supplied to both the upper and lower plates 31 and 32 and the light guiding member 4. The light is diffused in the upper and lower plates 31 and 32, and in the light guiding member 4, thereby supplying a larger amount of light to the LC member 3 uniformly.

In the conventional display device that light is supplied to the LCD member only through the light guiding member provided below the LCD member, it is necessary to increase the light receiving end surface of the light guiding member to supply a larger amount of light to the LCD member, which results in an increase in the thickness of the light guiding member. Usually, the thickness of the light guiding member of the conventional display device is 2 to 3 mm.

On the other hand, in the first embodiment of the present invention, light from the light emitting member 5 is supplied not only to the light guiding member 4 but also to the upper and lower transparent plates 31 an 32 of the LCD member 3. In other words, the upper and lower transparent plates 31 and 32 of the LCD member 3 acts also as a light guiding member. Accordingly, the thickness of the light guiding member 4 is thinned to half the thickness of the light guiding member of the conventional display device, i.e., to 1 to 1.5 mm. As a result, the display device 1 can be made thinner than the conventional display device. Accordingly, the display device 1 occupies a smaller space in an appliance on which it is to be mounted.

Further, the reflection sheet 42, the reflector 53, and the reflection sheets 61 are provided on the bottom surface of the light guiding member 4, in the light emitting member 5, and on the inner surfaces of the support member 6, respectively. Since the layer assembly 2 is surrounded by these reflecting members 42, 53, and 61, the light from the LED 51 does not leak outside by being reflected by the surrounding reflecting members 42, 53, and 61. As a result, most of the emitted light is either diffused in the layer assembly 2 or reflected by the reflecting members 42, 61 and 42, consequently being uniformly directed toward the LCD member 3. Therefore, the brightness or contrast of a display image to be produced in the display device 1 will increase.

Figure 3:
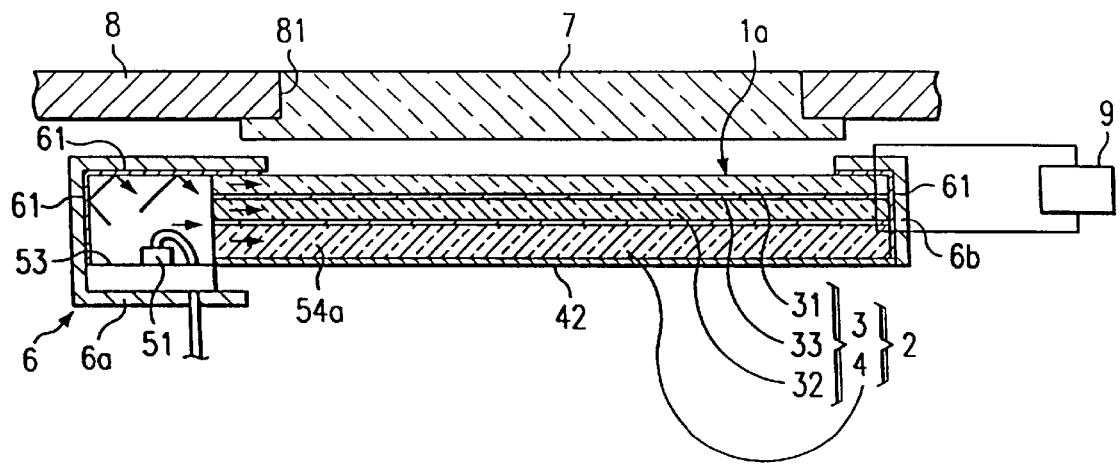
FIG. 3 is a sectional view of a second display device embodying the present invention, the second display device being provided with a second display member illuminator of the present invention.

FIG. 3 is a sectional view of a display device with a display member illuminator of a second embodiment of the invention. The second display device 1a is basically identical to the first display device 1 except as provided by the following. Like parts are allotted with like numerals to omit description of those parts.

In the second embodiment, a reflector 53 is provided in a light emitting member 5 in such a way that a reflection surface of the reflector extends in parallel with the extension of a layer assembly 2. The reflecting surface of the reflector 53 is flush with a reflection sheet 42 attached on a bottom surface of a light guiding member 4. The right end surface 54a of a transparent protector 52 is closely secured with layer assembly 2. Furthers reflection sheets 61 are lined on inner surfaces of a first support fitting 6a which are in contact with the surface of the protector 52.

In the second embodiment, the reflecting surface ofthe reflector 53 is arranged in the light emitting member 5 in parallel with the layer assembly 2. Accordingly, the reflector 53 can have a larger reflecting surface without being restricted to the thickness of the layer assembly 2. This enables the light emitting member 5 to emit a larger amount of light, thereby advantageously increasing the brightness of a display image to be produced in the display device 1a.

Figure 4:
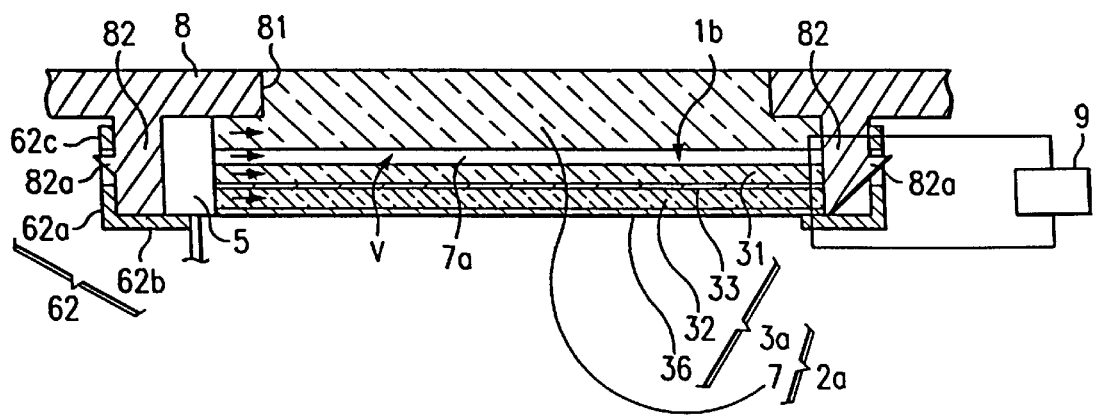
FIG. 4 is a sectional view of a third display device embodying the present invention, the third display device being provided with a third display member illuminator of the present invention.

FIG. 4 is a sectional view of a display device with a display member illuminator as a third embodiment of the invention. The third display device 1b is basically identical to the first display device 1 except as provided by the following. Similarly, like parts are allotted with like numerals.

In the third display device 1b, a layer assembly 2a includes an LCD member 3a and a protecting member 7 made of transparent material. The LCD member 3a is adhered with a reflection sheet 36 on a bottom surface thereof. Instead of the light guiding member 4 provided below the LCD member 3 in the first embodiment, the protecting member 7 fitted in a display window 81 above the LCD member 3a serves as a light guiding member.

The LCD member 3a and the protecting member 7 are spaced apart by a small distance to define a clearance 7a, e.g., 0.5 mm or more. A light emitting member 5 is closely secured with the left end surface of the layer assembly 2a so that light from the light emitting member 5 is supplied to the layer assembly 2a. The LCD member 3a used in the third embodiment is of reflection type which reflects light or causes it to pass through by applying a voltage on and off.

In this embodiment, an accommodating space V is defined by supporting walls 82 projecting downward from a housing 8. In the accommodating space V are placed a lower half of the protecting member 7, the light emitting member 5, and the LCD member 3a. In the display window 81 of the housing 8 is fitted an upper half of the protecting member 7 smaller in the lateral direction than the lower half thereof. The LCD member 3a is disposed below and spaced apart from the lower half of the protecting member 7 by a small distance in the space V. The light emitting member 5 is accommodated in the space V on the left side of the layer assembly 2a.

A support member 62 is provided to secure the layer assembly 2a accommodated in the space V on the housing 8. The support member 62 includes a vertical portion 62a and a horizontal portion 62b projecting inward from the lower edge of the vertical portion 62a. The light emitting member 5 and the layer assembly 2a are supported by the horizontal portion 62b with the vertical portion 62a fitted on the supporting wall 82.

Locking projections 82a are formed at specified positions of the outer surface of the supporting wall 82. Also, engaging holes 62c are formed in the vertical portion 62a at positions corresponding to the locking projections 82a. The locking projection 82a is fitted in the engaging hole 62c when the vertical portion 62a of the supporting member 62 is fitted on the supporting wall 82, with the result that the supporting member 62 is securely mounted on the supporting wall 82.

In this embodiment, the clearance 7a is formed between the bottom surface of the protecting member 7 and the top surface of the LCD member 3a. However, according to the present invention, it may be appreciated to arrange the LCD member 3a and the protecting member 7 in close contact with each other.

The light from the light emitting member 5 is incident on both the protecting member 7 and the LCD member 3a. The light supplied to the protecting member 7 is partly incident on the LCD member 3a through its bottom surface due to the diffusion therein. Accordingly, the surface of the LCD member 3a is very brightly illuminated by a sufficient amount of light. A display image appears and disappears according to application of a voltage to an LC cell 33.

In this embodiment, the clearance 7a is provided between the protecting member 7 and the LCD member 3a. Accordingly, the light from the light emitting member 5 comes into the clearance 7a. A portion of the coming light directly strikes an LC cell 33 of the LCD member 3a. Another portion of the incident light is reflected at a bottom surface of the protecting member 7 and then strikes the LC cell 33. In this way, the LC cell 33 is more illuminated by the light from the light emitting member 5.

In this embodiment, further, no light guiding member is provided below the LCD member 3a. The protecting member 7, which is provided above the LCD member 3a, is used as a light guiding member of the display device. Accordingly, the thickness of the display device 1b can be further made thinner.

Figure 5:
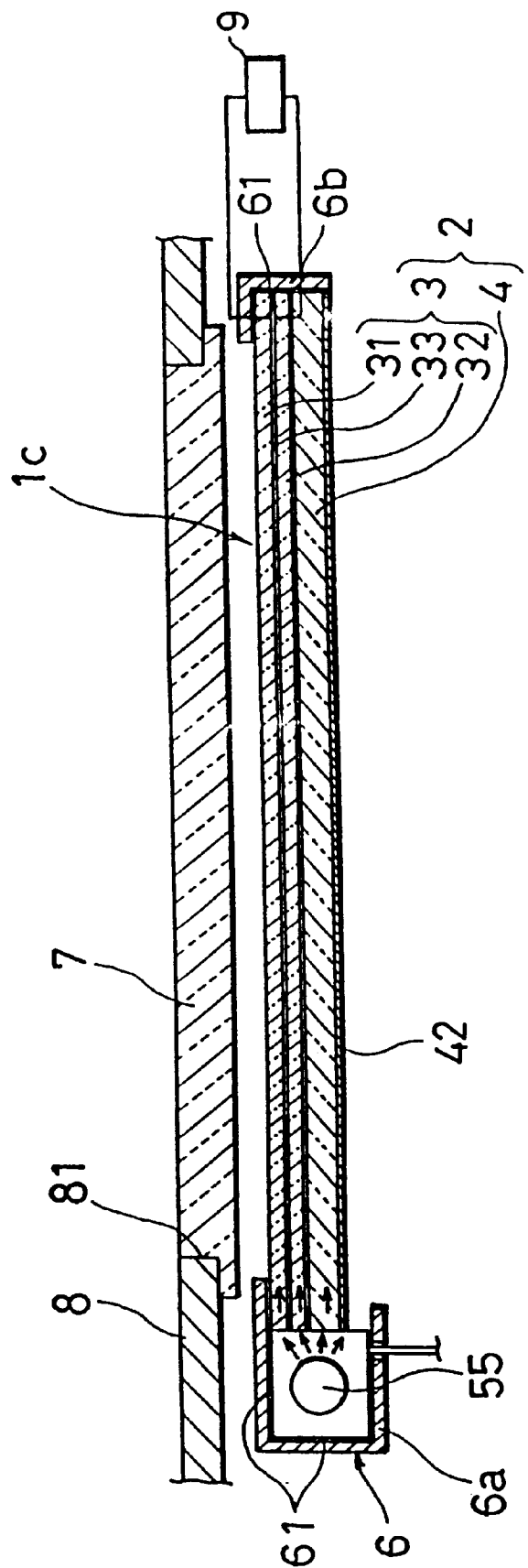
FIG. 5 is a sectional view of a fourth display device embodying the present invention, the fourth display device being provided with a fourth display member illuminator of the present invention.

FIG. 5 is a sectional view of a fourth display device with a display member illuminator as a fourth embodiment of the invention. The fourth display device 1c is basically identical to the first display device 1 except as provided by the following. Similarly, like parts are allotted with like numerals.

In the fourth embodiment, a light emitting member 5 is provided with a fluorescent lamp 55 as a light source. Forward and rearward ends of the fluorescent lamp 55 are supported by unillustrated forward and rearward connecting members connecting first and second support fittings 6a and 6b. Further, reflection sheets 61 are lined on inner surfaces of the first support fitting 6a.

The light emitted from the fluorescent lamp 55 is incident on both a light guiding member 4 and the LCD member 3 directly or reflected by the reflection sheets 61. Similarly to the first embodiment, accordingly, the LCD member 3 is supplied with a large amount of illuminating light from the light guiding member 4 and the upper and lower plates 31 and 32 of the LCD member 3. Thus, a display image is produced in the display device 1c more brightly and more contrastively. Further, in the fourth display device, the fluorescent lamp 55 is used as a light source. Accordingly, comparing to the first to third embodiments using LED, a considerably larger amount of light can be supplied to the LCD member 3. In other words, in the fourth embodiment, a display member having a larger viewing area can be illuminated.

Figure 6:
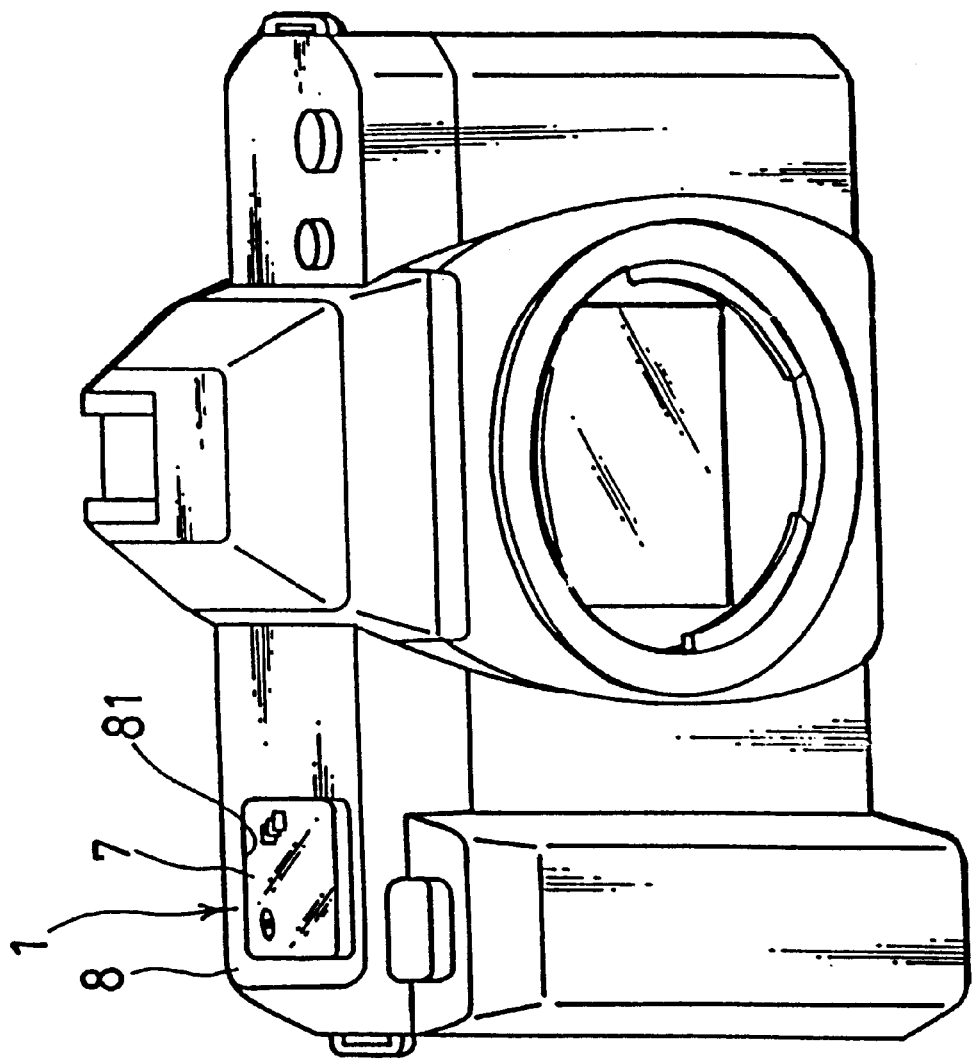
FIG. 6 is a perspective view of a camera embodying the present invention.
Figure 7:
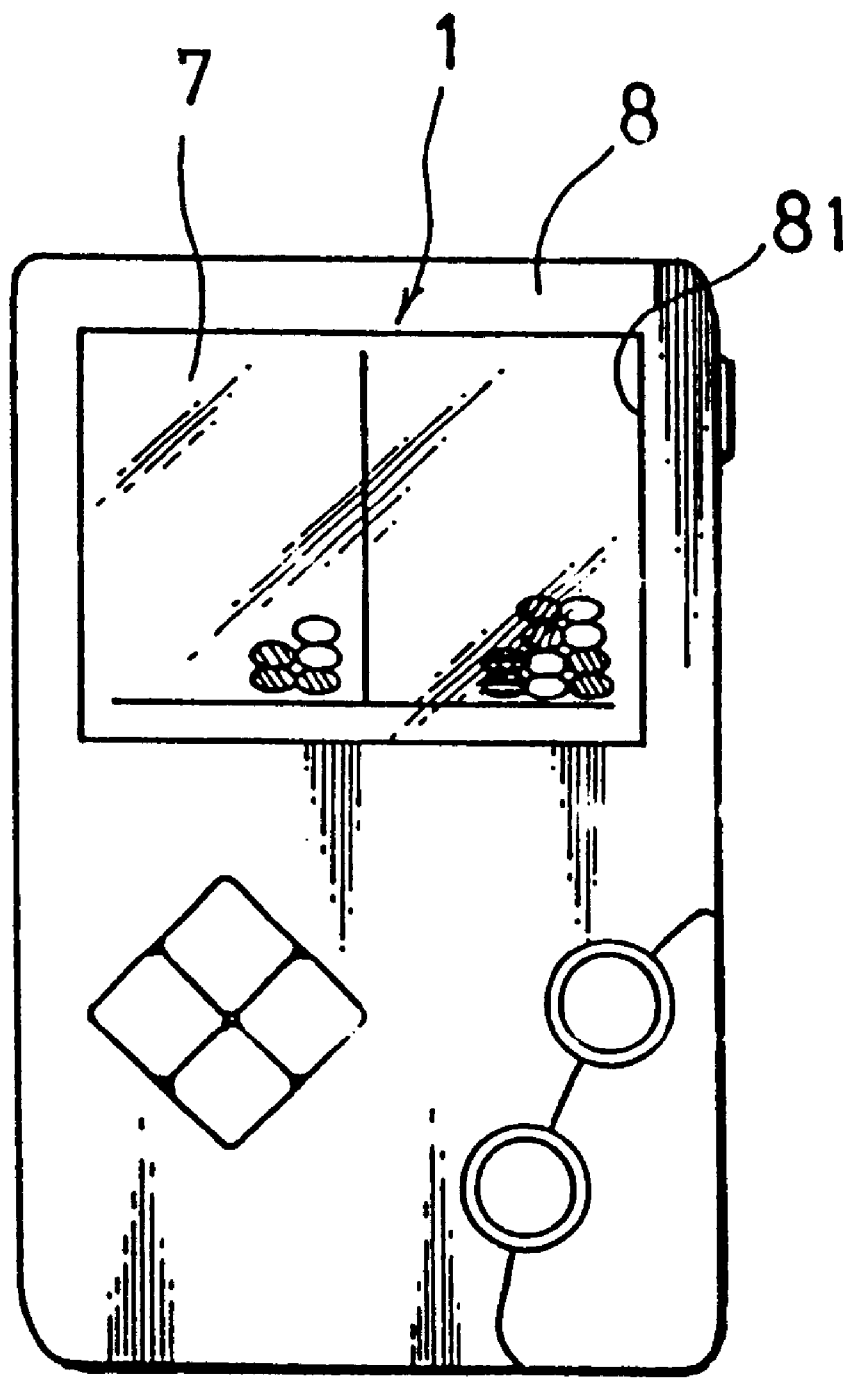
FIG. 7 is a front view of a portable video game machine embodying the present invention.
Figure 8:
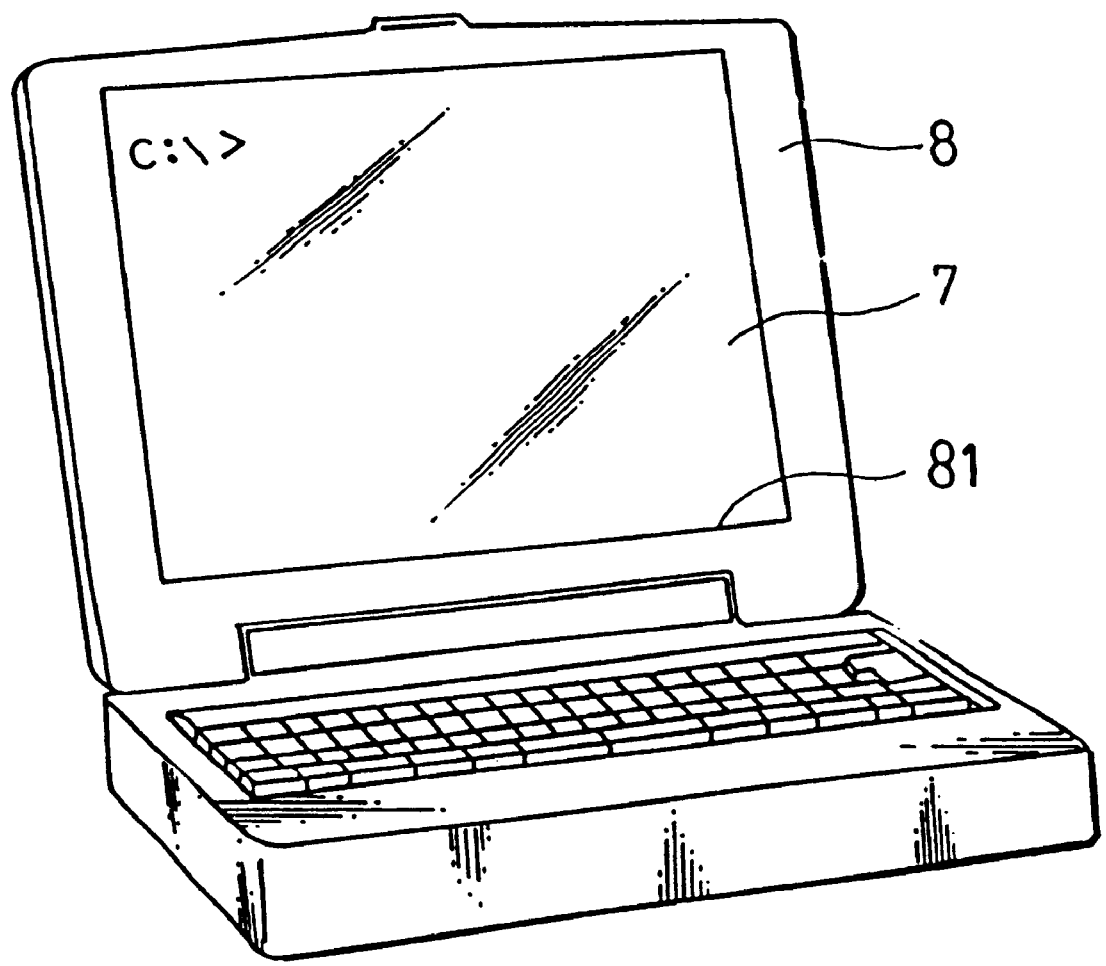
FIG. 8 is a perspective view of a lap-upper personal computer embodying the present invention.
Figure 9:
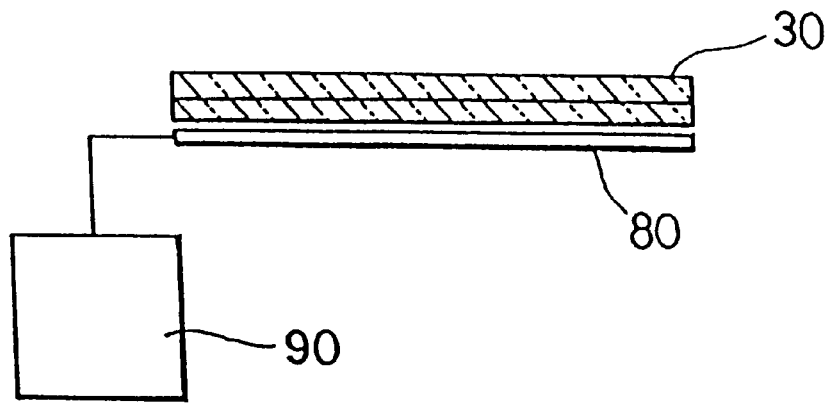
FIG. 9 is a sectional view of a conventional display device.
Figure 10:
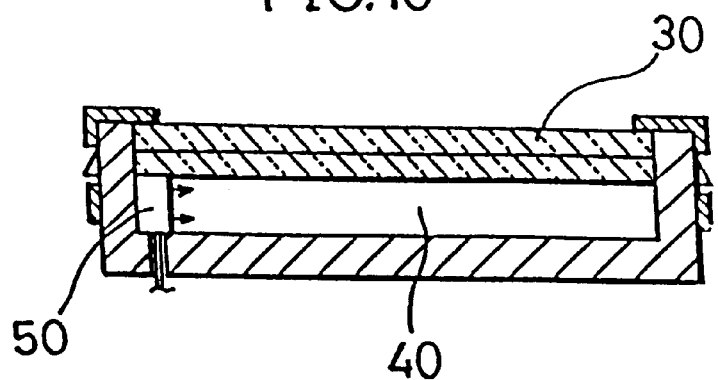
FIG. 10 is a sectional view of another convention al display device.
Figure 11:
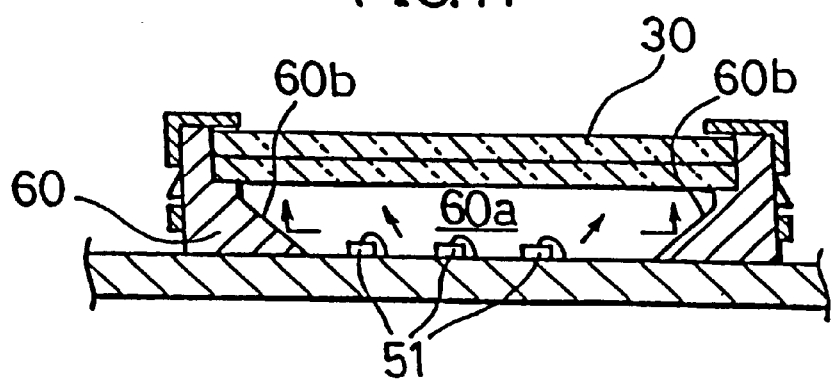
FIG. 11 is a sectional view of still another conventional display device.

FIGS. 6 to 8 show exemplary appliances embodying the present invention. These appliances are provided with a display device having a display member illuminator.

FIG. 6 shows a camera embodying the present invention. In view of the compactness required for a camera, in this camera, one of the above-mentioned first to third display devices 1, 1a, 1b is preferably mounted. The display device 1 (1a, 1b) is adapted for displaying an operation status of the camera. The display device 1 (1a, 1b) is disposed in an appropriate position of a top surface of the camera. The LED 51 of the light emitting member 5 is supplied with an electricity from a battery loaded in the camera. The transparent electrodes 34 of the LCD member 3 are controllably driven by the display driver 9. The display driver 9 is controlled by an unillustrated controller of the camera to produce a desired operation status image in the LCD member 3.

As mentioned above, in the display device 1 (1a, 1b), the illuminating light is introduced into both the upper and lower plates 31 and 32 of the LCD member 3 and the light guiding member 4 (7) provided below or above the LCD member 3, thereby producing a brighter display image. Accordingly, the user of the camera can see a clearer and more contrasting display image. Also, it is not necessary to increase the thickness of the light guiding member 4 to produce a brighter display image. This will be advantageous in reducing the size of camera.

FIG. 7 shows a portable video game machine embodying the present invention. In view of the portability required for a portable video game machine, in this game machine, one of the above-mentioned first to third display devices 1, 1a, 1b is preferably mounted. The display device 1 (1a, 1b) is adapted for displaying a game image. The display device 1 (1a, 1b) is disposed in an appropriate position of a front surface of the machine. The LED 51 of the light emitting member 5 is supplied with an electricity from a battery loaded in the machine. The driving of the transparent electrodes 34 of the LCD member 3 is controlled in accordance with a game program loaded in the machine and player's instructions via the display driver 9. A game image can be clearly produced in the display device owing to the illumination of the LCD member 3 by the way of both the light guiding member 4 (7) and the upper and lower transparent member 31 and 32 of the LCD member 3.

FIG. 8 shows a lap-top personal computer embodying the present invention. In view of the large viewing area of a personal computer, in this personal computer, the above-mentioned fourth display device 1c is preferably mounted. The display device 1c is adapted for displaying a computerized produced image. The display device 1c is mounted in a lid housing 8 of the lap-top personal computer. The fluorescent lamp 55 of the light emitting member 5 is supplied with an electricity from a battery loaded in the computer. The transparent electrodes 34 of the LCD member 3 are driven by the display driver 9. The display driver 9 is controlled by a CPU controller in the computer.

The illuminating light emitted from the fluorescent lamp 55 is introduced into both the upper and lower plates 31 and 32 of the LCD member 3 and the light guiding member 4 provided below the LCD member 3. Also, the fluorescent lamp 55 can emit a larger amount of light. Accordingly, a display image can be more clearly produced in the viewing area.

In the foregoing embodiments, an LCD member is used as a display member. However, the present invention is not limited to the use of an LCD member. For example, a PLZT member may be used as a display member.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A display device comprising:
   a display member including a first plate and a second plate and a displaying material positioned between and supported by said plates, said first plate being light transmissive;
   a light guiding member which faces and extends in parallel with the display member, said light guiding member facing said first plate; and
   a light source which illuminates a side end of the first plate and a side end of the light guiding member, so that light transmitted by multiple internal reflections along the inside of each of the first plate and the light guiding member illuminates the displaying material.

2. A display device in accordance with claim 1, wherein said display member is a liquid crystal display.

3. A display device in accordance with claim 2, wherein said liquid crystal display is a transmissive liquid crystal display.

4. A display device in accordance with claim 2, wherein said liquid crystal display is a reflective liquid crystal display.

5. A display device in accordance with claim 1, further comprising:
   a driver to drive the display member to produce a display image.

6. A display device in accordance with claim 1, further comprising:
   a generally U-shaped supporting member having an inner channel;
   wherein the supporting member is disposed over the side end of the light guiding member and a side end of the display member so that the light guiding member and the display member are disposed partly in said inner channel, and wherein the light source is disposed in the inner channel between the supporting member and the light guiding member and the display member.

7. A display device in accordance with claim 6, further comprising:
   a light reflecting sheet disposed on the interior of the inner channel of the generally U-shaped supporting member for reflecting light from the light source.

8. A display device in accordance with claim 1, wherein said light guiding member is disposed at an observation side.

9. A display device in accordance with claim 1, wherein said light guiding member is disposed at a side opposite to an observation side.

10. A display device comprising:
    a display member which includes a first plate and a second plate and a displaying material positioned between and supported by said plates, said first plate being light transmissive;
    a light guiding member which faces and extends in parallel with the display member, said light guiding member facing said first plate; and
    a light source which illuminates a side end of the display member and a side end of the light guiding member, so that light transmitted by multiple internal reflections along the inside of each of the first plate, the second plate and the light guiding member illuminates the displaying material.

11. A display device in accordance with claim 10, wherein said display member is a liquid crystal display.

12. A display device in accordance with claim 11, wherein said liquid crystal display is a transmissive liquid crystal display.

13. A display device in accordance with claim 11, wherein said liquid crystal display is a reflective liquid crystal display.

14. A display device in accordance with claim 10, further comprising:
    a driver to drive the display member to produce a display image.

15. A display device in accordance with claim 10, further comprising:
    a generally U-shaped supporting member having an inner channel;
    wherein the supporting member is disposed over the side end of the light guiding member and a side end of the display member so that the light guiding member and the display member are disposed partly in said inner channel, and wherein the light source is disposed in the inner channel between the supporting member and the light guiding member and the display member.

16. A display device in accordance with claim 15, further comprising:
    a light reflecting sheet disposed on the interior of the inner channel of the generally U-shaped supporting member for reflecting light from the light source.

17. A display device in accordance with claim 10, wherein said light guiding member is disposed at an observation side.

18. A display device in accordance with claim 10, wherein said light guiding member is disposed at a side opposite to an observation side.

19. An appliance having a display window through which information concerning the operation of said appliance can be displayed, said appliance comprising:
- a display member, provided adjacent to said display window, including a first plate and a second plate and a displaying material positioned between and supported by said plates, said first plate being light transmissive;
- a light guiding member which faces and extends in parallel with the display member, said light guiding member facing said first plate; and
- a light source which illuminates a side end of the first plate and a side end of the light guiding member, so that light transmitted, by multiple internal reflections, along the inside of each of the first plate and the light guiding member illuminates the displaying material.

20. An appliance in accordance with claim 19, wherein said display member is a liquid crystal display.

21. An appliance in accordance with claim 20, wherein said liquid crystal display is a transmissive liquid crystal display.

22. An appliance in accordance with claim 20, wherein said liquid crystal display is a reflective liquid crystal display.

23. An appliance in accordance with claim 19, further comprising:
- a driver to drive the display member to produce a display image.

24. An appliance in accordance with claim 19, further comprising:
- a generally U-shaped supporting member having an inner channel;
- wherein the supporting member is disposed over the side end of the light guiding member and a side end of the display member so that the light guiding member and the display member are disposed partly in said inner channel, and wherein the light source is disposed in the inner channel between the supporting member and the light guiding member and the display member.

25. An appliance in accordance with claim 24, further comprising:
- a light reflecting sheet disposed on the interior of the inner channel of the generally U-shaped supporting member for reflecting light from the light source.

26. An appliance in accordance with claim 19, wherein said light guiding member is disposed at an observation side.

27. An appliance in accordance with claim 19, wherein said light guiding member is disposed at a side opposite to an observation side.

28. An appliance having a display window through which information concerning the operation of said appliance can be displayed, said appliance comprising:
- a display member, provided adjacent to said display window, including a first plate and a second plate and a displaying material positioned between and supported by said plates, said first plate being light transmissive;
- a light guiding member which faces and extends in parallel with the display member, said light guiding member facing said first plate; and
- a light source which illuminates a side end of the display member and a side end of the light guiding member, so that light transmitted by multiple internal reflections along the inside of each of the first plate, the second plate and the light guiding member illuminates the displaying material.

29. An appliance in accordance with claim 28, wherein said display member is a liquid crystal display.

30. An appliance in accordance with claim 29, wherein said liquid crystal display is a transmissive liquid crystal display.

31. An appliance in accordance with claim 29, wherein said liquid crystal display is a reflective liquid crystal display.

32. An appliance in accordance with claim 28, further comprising:
- a driver to drive the display member to produce a display image.

33. An appliance in accordance with claim 28, further comprising:
- a generally U-shaped supporting member having an inner channel;
- wherein the supporting member is disposed over the side end of the light guiding member and a side end of the display member so that the light guiding member and the display member are disposed partly in said inner channel, and wherein the light source is disposed in the inner channel between the supporting member and the light guiding member and the display member.

34. An appliance in accordance with claim 33, further comprising:
- a light reflecting sheet disposed on the interior of the inner channel of the generally U-shaped supporting member for reflecting light from the light source.

35. An appliance in accordance with claim 28, wherein said light guiding member is disposed at an observation side.

36. An appliance in accordance with claim 28, wherein said light guiding member is disposed at a side opposite to an observation side.

37. A display device comprising:
- a display, said display being adapted to receive light at a side end thereof and transmit light therethrough by multiple internal reflections;
- a light guiding member which faces and extends in parallel with the display, said light guiding member being separated from said display by an air gap; and
- a light source which illuminates both a side end of the display and a side end of the light guiding member so that light transmitted by multiple internal reflections along the inside of each of the display and the light guiding member illuminates the display.

38. A display device in accordance with claim 37, wherein said display is a liquid crystal display.

39. A display device in accordance with claim 38, wherein said liquid crystal display is a transmissive liquid crystal display.

40. A display device in accordance with claim 38, wherein said liquid crystal display is a reflective liquid crystal display.

41. A display device in accordance with claim 37, further comprising:
- a driver to drive the display to produce a display image.

42. A display device in accordance with claim 37, further comprising:
- a generally U-shaped supporting member having an inner channel;
- wherein the supporting member is disposed over the side ends of the light guiding member and the display so that the light guiding member and the display are disposed partly in said inner channel, and wherein the light source is disposed in the inner channel between the supporting member and the light guiding member and the display.

43. A display device in accordance with claim 42, further comprising:

a light reflecting sheet disposed on the interior of the inner channel of the generally U-shaped supporting member for reflecting light from the light source.

44. A display device in accordance with claim 37, wherein said light guiding member is disposed at an observation side.

45. A display device in accordance with claim 37, wherein said light guiding member is disposed at a side opposite to an observation side.

46. A display device in accordance with claim 37, wherein:

said light source illuminates said gap in addition to said side end of the display and said side end of the light guiding member, so that said display is illuminated by light transmitted along the inside of each of the display and the light guiding member, by multiple internal reflections, as well as by light shining through said gap.

* * * * *